UNITED STATES PATENT OFFICE.

GEORGE DURYEE, OF NEW YORK, N. Y.

IMPROVEMENT IN THE MANUFACTURE OF PRINTING-INKS.

Specification forming part of Letters Patent No. 48,385, dated June 27, 1865.

*To all whom it may concern:*

Be it known that I, GEORGE DURYEE, of the city and State of New York, have invented a new and Improved Printing-Ink made from Petroline-Wax; and I do hereby declare that the following is a full and exact description of the mode of making same.

The nature of my invention consists, principally, in the substitution of the petroline-wax (as prepared in the mode directed below) for linseed-oil or other oils used in the manufacture of printing-inks.

To enable others skilled in the art to make and use my invention, I will proceed to describe the method of manufacturing.

First. In distilling petroleum or coal-oil there is left in the still after the oil has passed off a dark-colored residue, consisting mainly of paraffine with carbonaceous matter. Of this residuum I take one hundred pounds, to which I add, in proper vessel, twenty-five pounds of the waste sulphuric acid which has been used in the deodorizing of petroleum, and then agitate the mass together for half an hour, or until it becomes of a thick tenacious consistency, nearly black, carbonized by the acid, and converted also into what I term "petroline-wax." I then add water to wash out the acid with constant agitation, and, if necessary, add a little chloride of lime, which, while neutralizing the remaining acid, destroys any unpleasant odors that may remain in the wax so prepared. After agitating again I allow the mixture to stand, when the water and lime settle to the bottom of the vessel, where they are drawn off by stopcock.

The petroline-wax as made by this process requires less lamp-black or resin for making inks than any substance known.

In making the inks I proceed as follows: In a large iron boiler I put two hundred pounds of the petroline-wax, to which is to be added one hundred pounds of resin or asphaltum, and five pounds of acetate of lead or sugar of lead; then boil for one or two hours, or until the ingredients are thoroughly incorporated into a varnish, which varnish may be made with less resin if a lighter ink be required. To three hundred pounds of this varnish so prepared I add, while hot, fifty pounds of lamp-black, and then grind the whole in suitable mills, the result being the ink for which I ask a patent.

If a heavy book-ink be required, more resin and lampblack are to be added; or if a quick-drying ink, more acetate of lead may be used.

I do not claim the use of hydrocarbons for the manufacture of printing-ink, as I am aware that benzine or other products have been employed for the purpose of making inks; but What I do claim, and desire to secure by Letters Patent, is—

1. The improved ink prepared of the materials and in the manner substantially as herein set forth and described.

2. As a basis for the manufacture of various kinds of printers' ink, the material derived from the residuum of petroleum, and herein designated as "petroline-wax," the same to be used substantially as set forth.

GEORGE DURYEE.

Witnesses:
JOHN B. IRELAND,
C. J. HASTINGS.